May 23, 1933.  F. M. REID  1,910,181
VEHICLE BRAKE
Filed Nov. 10, 1930   2 Sheets-Sheet 2
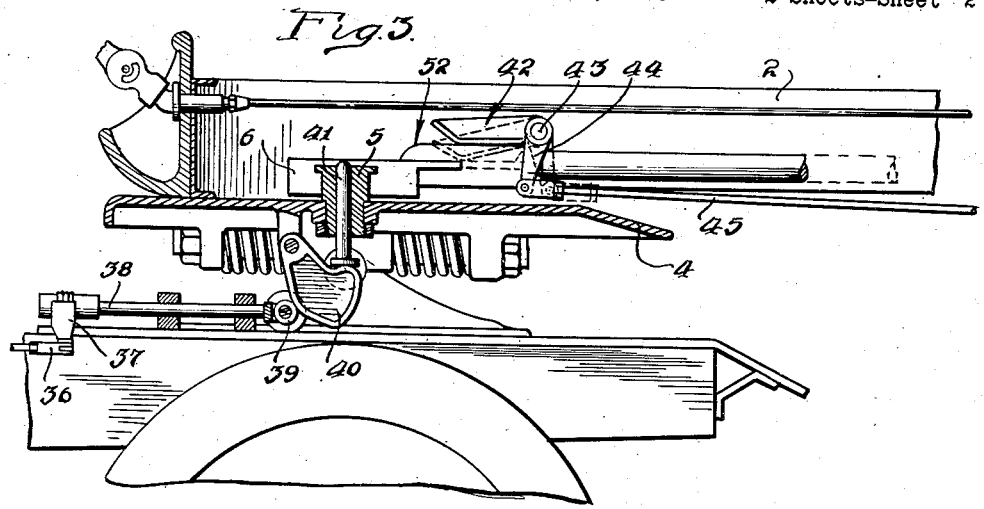
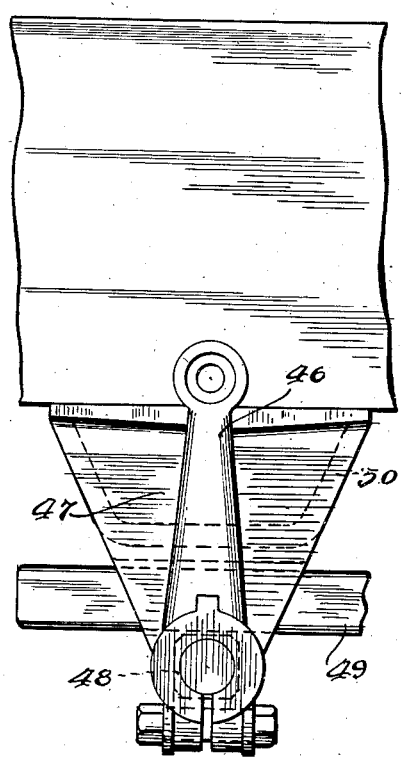
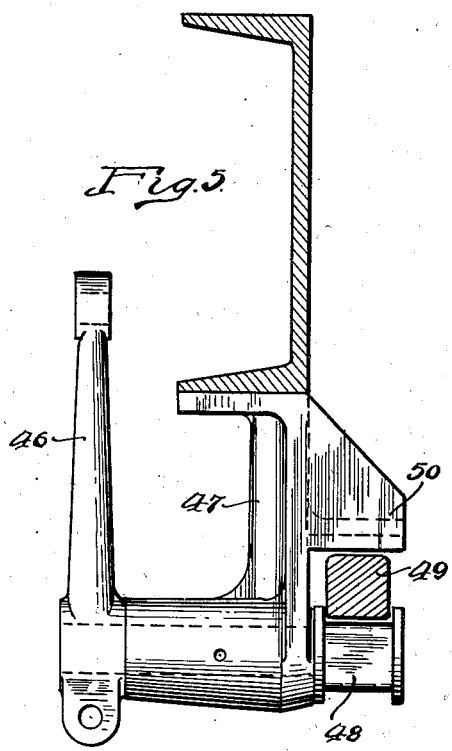
INVENTOR.
FREDERICK M. REID.
BY
Barnes & Tisselle
ATTORNEYS.

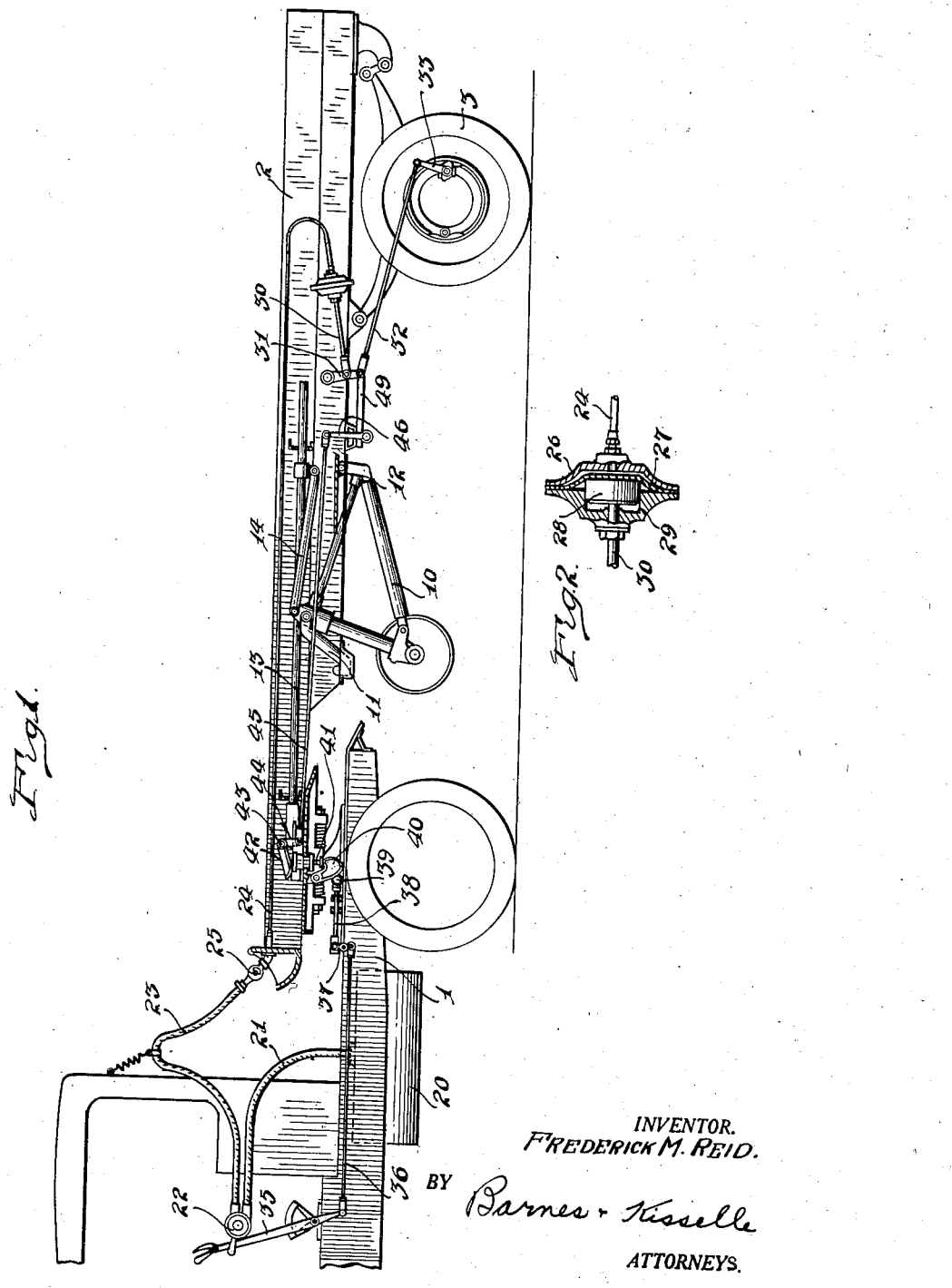
May 23, 1933.  F. M. REID  1,910,181
VEHICLE BRAKE
Filed Nov. 10, 1930   2 Sheets-Sheet 1
INVENTOR.
FREDERICK M. REID.
BY Barnes + Kisselle
ATTORNEYS.

Patented May 23, 1933

1,910,181

UNITED STATES PATENT OFFICE

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN

VEHICLE BRAKE

Application filed November 10, 1930. Serial No. 494,533.

This invention relates to vehicle brakes and it is concerned particularly with means for application of and for the holding of brakes applied. An advantageous environment for the invention is in tractor-trailer combinations and tractor-semitrailer combinations, and in such a combination the brakes for the wheels of the semitrailer may be actuated and held applied by means arranged in accordance with the invention. More specifically, the invention is directed toward the provision of power application of brakes together with mechanical retaining means.

In the accompanying drawings:

Fig. 1 is a side elevational view showing a tractor-trailer combination equipped with a brake control mechanism constructed in accordance with the invention.

Fig. 2 is a detail of a construction which will suffice for a power application of the brakes.

Fig. 3 is a view with some parts in section illustrating the holding means.

Figs. 4 and 5 are details of other brake-holding means.

The rear end of a tractor having traction wheels is shown at 1 while a semitrailer is shown at 2 having rear supporting wheels 3. The front end of the semitrailer rests upon the tractor, and for this purpose there is a lower fifth wheel plate 4 carried by the tractor upon which the front end of the trailer rests, and on the fifth wheel plate is a king pin 5, the semitrailer has a suitable locking device, as at 6, for engaging the king pin. The type of tractor-semitrailer coupling may vary to a large degree as the fifth wheel mounting between the two may vary; the king pin may be on the trailer rather than on the tractor. When the tractor disengages the trailer to leave it standing, the forward end thereof is held up by a support 10, one end of which reciprocates in an inclined guide 11, and the other end in the horizontal guide 12. A reciprocating service bar is shown at 13 and it is connected to the support by a link 14. When the tractor and semitrailer are coupled as shown in Fig. 1, the latch 6 is pushed rearwardly in the frame of the trailer and the latch is associated with the service bar to position it rearwardly thus drawing up the support 10. When the two vehicles uncouple the latch moves forwardly on the trailer frame, the service bar 13 moves forwardly and the support 10 moves down closer to the ground to engage the same and support the front end of the trailer when the tractor moves out from under it. This type of supporting and latch structure is shown in this case for exemplary purposes and is subject to wide variation, and it is unnecessary to go further into details as regards this structure as the same is shown and claimed in my Patent #1,611,947 of December 28, 1926. The latch or coupling merely enters into the present combination as an element thereof.

The power means for applying the trailer brakes may take the form of fluid pressure although other power means may be employed. In the present instance fluid pressure is shown and there may be on the tractor a tank 20 for compressed air and suitable means (not shown) may be provided for supplying and maintaining compressed air in the tank. Leading from this tank is a conduit 21 while at 22 there is a valve, and leading from the valve is a conduit or hose 23. A conduit 24 is on the trailer and the hose 23 and conduit 24 may be joined by suitable coupling 25. Conduit 24 leads into a suitable machine, device or cylinder which, as shown in Fig. 3, may comprise an exterior housing 26 having therein a diaphragm 27, a piston 28 reciprocating in a cylinder formation 29 and having a piston rod 30. This piston rod 30 when moved serves to apply the brakes, and for this purpose there may be a pivoted arm 31 to which the piston rod connects while brake rod 32 connects with the arm and the trailer wheel brakes 33.

The valve 22 serves to establish a connection from the compressed air tank to the piston 28 and when this connection is established the piston is moved from right to left rocking the arm 31 and applying the brakes. When the valve is properly controlled by an operator, the connection may be broken and the air discharged through the valve, and the brakes thereupon release themselves due to their own spring tendency. It will be noted, however, that to disconnect the tractor and semitrailer the coupling 25 has to be disconnected and this would relieve the air and release the brakes. Accordingly, mechanical means are provided for holding the brakes applied.

The mechanical means may advantageously be controlled from the tractor, and for this purpose there may be a lever 35 connected to a rod 36 one end of which connects to a horizontally pivoted lever 37 the other end of which connects to a rod 38 (Fig. 3) the rod 38 having means on its end such as a roller 39 for engaging a pivotally mounted actuator 40. Through the center of the king pin 5 is an operating pin 41 arranged to reciprocate in the king pin, and resting upon the top of the king pin is an arm 42 rigidly attached to a rocker shaft 43 in turn having an arm 44 connected to rod 45. The parts 42, 43 and 44 in assembly constitute substantially a bell crank. The rod 45 connects at its end with a pivoted arm 46 which, as shown in Figs. 4 and 5; may be mounted upon a bracket 47 secured to the frame and which is associated with an eccentric or cam element 48. Where either of these words is used in appended claims it is intended to cover the other or various equivalents. A rod or the like 49 which constitutes an element to be locked, is connected to the rocker arm 31 and, as shown in Fig. 5, is positioned so as to reciprocate between the cam 48 and a suitable bracket 50.

To set the brakes the truck operator manipulates valve 22 and the brakes are set by air pressure. Then by rocking hand lever 35, rod 38 is pushed from left to right (Fig. 3); this rocks the member 40, lifts pin 41, which in turn, raises arm 42, rocks shaft 43 which pulls the rod 45 through the arm 44. This results in actuation of the cam or eccentric 48 which grips the rod 49 between itself and bracket 50. Thus, after the brakes are once applied by power the mechanical means may be operated to hold the position of the applied brakes.

So much for holding the brakes applied while the tractor and trailer are connected; however, the brakes may as well be held applied when the tractor and semitrailer disconnect. For this purpose the end of the service bar 13 is arranged to hold the arm 42 lifted when the tractor and semitrailer disconnect, as shown in Fig. 3. The end of the service bar may have a cam element or inclined face 52 arranged to ride under the arm 42. In my patent above mentioned a service bar of this type is shown and described and the operation is that when the tractor and semitrailer disconnect the service bar moves forward so that its front end moves in under and holds the arm 42 elevated thus keeping the rod 49 clamped by the cam element. Accordingly, it will be noted that when the brakes are applied by power they may be held applied mechanically while the tractor and semitrailer are connected and/or when they are disconnected. Fig. 3 shows the tractor somewhat forward of locked position with the trailer with the portion 52 on the service bar holding the arm 42 in brake holding position.

This arrangement is advantageous from a number of standpoints. One is that it is especially applicable where fluid pressure is employed as the power means; by applying the brakes with power, as by means of fluid pressure, they can be applied very effectively and with considerable force, but to maintain the brakes in applied position is not the most feasible arrangement because as the air pressure leaks out the brakes become loosened. With the present construction the brakes may be applied by the pressure then held mechanically so that the maintenance of air pressure is not relied upon to hold the brakes. Another thing is that by applying the brakes with air pressure variation in brake tightness and brake lining wear is automatically taken care of. In other words, as the brake lining becomes worn the operating piston is merely moved further to apply the brakes. Piston movement may also vary in the event the brake lining becomes wet and swells. When the end of the service rod moves under the arm 42 the arm 42 takes, at this time, a relatively constant position so that it would not readily compensate for brake variation, but in the present construction this works out very nicely as the parts may be adjusted so that this constant position of the arm 42, as determined by the service rod, rocks the cam or eccentric 48, and clamps bar 49, and of course there is no material variation from day to day in relation between the cam and bar 49.

To uncouple the tractor and semitrailer the brakes may be first set by manipulation of the valve 22 when locked by manipulation of lever 35. The coupling 25 is then disconnected and the tractor-semitrailer disconnected. Upon coupling the tractor is backed into the semitrailer and the brakes remain applied until released by the lever 35. In order that the brakes may be utilized in the tractor-semitrailer combination after coupling, it is necessary to attach the coupling 25. Thus the service brake or the brake employed during tractor-semitrailer usage may be controlled entirely from the valve 22, but when it is necessary or desirable to leave the tractor and semitrailer with the semitrailer brakes applied, or to disconnect the semitrailer, its brakes may be held by mechanical means.

I claim:

1. The combination with a tractor, a trailer adapted to be drawn by the tractor, brakes on the wheels of the trailer, power means controllable from the tractor for applying the brakes, mechanical means controllable at will for holding the brakes applied independently of the power means while tractor and trailer are connected, and shiftable means on the trailer shiftable to brake-holding position when tractor and trailer separate whereby to permit of tractor-trailer separation with the trailer brakes held applied.

2. The combination with a tractor, a trailer adapted to be drawn by the tractor, brakes on the wheels of the trailer, power means controllable from the tractor for applying the brakes, mechanical means controllable from the tractor for holding the brakes thus applied independently of the power means while tractor and trailer are connected, and shiftable means on the trailer shiftable to brake-holding position when tractor and trailer separate whereby to permit of tractor-trailer separation with the trailer brakes held applied.

3. The combination with a tractor and semitrailer arranged for combined and independent usage, brakes on the semitrailer wheels, compressed air means controllable from the tractor for applying the semi-trailer brakes when the tractor and semi-trailer are connected, mechanical means on the trailer controllable at will from the tractor and operable when tractor and semi-trailer are connected to hold the semitrailer brakes applied independently of the air pressure means, and means on the trailer shiftable upon the tractor-trailer separator for holding the trailer brakes applied when tractor and trailer are separated.

4. The combination with a tractor and semitrailer, of brakes for the semitrailer wheels, fluid pressure means on the tractor, conduits on the tractor and semitrailer, a detachable coupling for the conduits, means actuated by the fluid pressure to apply the brakes, valve means on the tractor for controlling the fluid pressure, a manually controlled lever on the tractor, mechanical means on the trailer for holding the brakes applied, and means extending through the tractor-semitrailer connection for establishing an operable association between the lever and said mechanical means.

5. The combination with a tractor, a semi-trailer, a fifth wheel and king pin connection between the tractor and semitrailer, brakes for the semitrailer wheels, air pressure means on the tractor, conduits on the tractor and on the semitrailer, a detachable coupling between the conduits, means movable by air pressure to apply the trailer brakes, a valve on the tractor for controlling the air pressure, mechanical means on the semitrailer movable to hold the brakes applied independently of the air pressure means, a lever on the tractor, a reciprocable operating pin on the axial center of the king pin, and connections between this reciprocable operating pin and the lever and the brake-holding means on the semitrailer.

6. The combination with a tractor and semi-trailer, a detachable swivel connection between the tractor and semi-trailer, brakes for the semi-trailer wheels, fluid pressure means on the tractor, conduits on the tractor and semitrailer, a detachable coupling for the conduits, means actuated by fluid pressure and located on the trailer to apply the trailer brake, valve means on the tractor for controlling the fluid pressure, a manually controlled lever on the tractor, mechanical means on the trailer for holding the brakes applied, means extending through the detachable tractor-semitrailer connection for establishing an operable association between the lever and said mechanical means, and means on the trailer shiftable upon tractor-trailer separation into a position to hold said mechanical means in brake holding condition.

In testimony whereof I affix my signature.

FREDERICK M. REID.